(12) United States Patent
Kamada et al.

(10) Patent No.: US 9,150,080 B2
(45) Date of Patent: Oct. 6, 2015

(54) COOLING SYSTEM OF BATTERY

(75) Inventors: Takayuki Kamada, Chita-County (JP);
Yoshinori Ichishi, Kariya (JP); Yasushi Kondo, Aichi-County (JP); Satoshi Izawa, Anjo (JP); Motohiro Yamaguchi, Toyokawa (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 542 days.

(21) Appl. No.: 13/478,368

(22) Filed: May 23, 2012

(65) Prior Publication Data

US 2012/0297805 A1 Nov. 29, 2012

(30) Foreign Application Priority Data

May 27, 2011 (JP) ................. 2011-119022

(51) Int. Cl.
*F25B 41/00* (2006.01)
*F25D 23/12* (2006.01)
(Continued)

(52) U.S. Cl.
CPC ........ *B60H 1/00278* (2013.01); *B60H 1/00885* (2013.01); *F25B 5/02* (2013.01); *F25B 49/022* (2013.01); *B60H 2001/00307* (2013.01); *B60H 2001/00928* (2013.01); *B60H 2001/00949* (2013.01); *F25B 25/005* (2013.01);
(Continued)

(58) Field of Classification Search
CPC ............. B60K 11/02; B60K 2001/005; B60H 1/00278; B60H 2001/00928; B60H 2001/00949; B60H 2001/00307; B60H 1/00287; B60H 1/143; B60L 2240/36; H01M 10/625

USPC .............................. 62/196.1, 208, 259.2, 525
See application file for complete search history.

(56) References Cited

U.S. PATENT DOCUMENTS 6,073,456 A * 6/2000 Kawai et al. .................... 62/133
6,330,909 B1 * 12/2001 Takahashi et al. ............ 165/202
(Continued)

FOREIGN PATENT DOCUMENTS

JP    H10-162867    6/1998
JP    H11-40212     2/1999
(Continued)

OTHER PUBLICATIONS

Office Action issued Jul. 2, 2013 in corresponding Japanese Application No. 2011-119022 (with English translation).

*Primary Examiner* — M. Alexandra Elve
*Assistant Examiner* — Henry Crenshaw
(74) *Attorney, Agent, or Firm* — Harness, Dickey & Pierce, P.L.C.

(57) ABSTRACT

A cooling system of a battery which efficiently cools a high voltage battery which is mounted in an electric vehicle or a hybrid vehicle so as to maintain battery performance by using a refrigeration cycle of an air-conditioning system, which is provided with an electric compressor, outside heat exchanger, inside heat exchanger, and a control device. A refrigerant path of the air-conditioning system for running refrigerant is provided with a branch path having a heat exchanger which bypasses the inside heat exchanger, a medium path connected to the heat exchanger runs another refrigerant for cooling the battery, control valves are provided which adjust the amounts of the refrigerant which flows to the refrigerant path and the branch path, and, when the control valves run the refrigerant to both the refrigerant path and the branch path, the control device increases the speed of the electric compressor.

11 Claims, 9 Drawing Sheets

(51) Int. Cl.
  *F25B 39/02* (2006.01)
  *B60H 1/00* (2006.01)
  *F25B 5/02* (2006.01)
  *F25B 49/02* (2006.01)
  *F25B 25/00* (2006.01)

(52) U.S. Cl.
  CPC ... *F25B2600/021* (2013.01); *F25B 2600/2507* (2013.01); *F25B 2700/2106* (2013.01); *F25B 2700/21173* (2013.01)

(56) References Cited

U.S. PATENT DOCUMENTS

| | | | |
|---|---|---|---|
| 6,394,210 B2 * | 5/2002 | Matsuda et al. | 180/68.1 |
| 6,530,426 B1 * | 3/2003 | Kishita et al. | 165/202 |
| 6,834,510 B1 * | 12/2004 | Pfister et al. | 62/149 |
| 2004/0172959 A1 * | 9/2004 | Oomura et al. | 62/228.1 |
| 2007/0227168 A1 * | 10/2007 | Simmons | 62/229 |
| 2008/0295535 A1 * | 12/2008 | Robinet et al. | 62/259.2 |
| 2009/0249802 A1 * | 10/2009 | Nemesh et al. | 62/56 |
| 2009/0249807 A1 * | 10/2009 | Nemesh et al. | 62/117 |
| 2011/0048671 A1 * | 3/2011 | Nishikawa et al. | 165/42 |
| 2011/0088421 A1 * | 4/2011 | Wakamoto et al. | 62/238.7 |
| 2013/0213631 A1 * | 8/2013 | Ichishi et al. | 165/202 |

FOREIGN PATENT DOCUMENTS

| | | |
|---|---|---|
| JP | 2001-105843 | 4/2001 |
| JP | 2002-354608 | 12/2002 |
| JP | 2010-226894 | 10/2010 |
| JP | 2011-49139 | 3/2011 |

* cited by examiner

COOLING SYSTEM OF BATTERY

BACKGROUND OF THE INVENTION

1. Field of the Invention

The present invention relates to a cooling system of a battery which cools a battery, which supplies electric power to a drive-use electric motor, by utilizing a refrigerant of an air-conditioning system which is mounted in the vehicle. A vehicle which mounts a drive-use electric motor is either an electric vehicle or a hybrid vehicle. The present invention relates to a cooling system of a battery which is designed to not detract from the comfortable feeling of air-conditioning given to the passengers by the air-conditioning system.

2. Description of the Related Art

In recent years, electric vehicles (EV) and hybrid vehicles (HV) have been commercialized. Along with this, the capacity of the batteries which supply electricity to the drive-use motors which are mounted in these vehicles has become larger and the output voltage has become higher. Further, an HV or EV carries a large number of batteries for use as sources of drive power, so the battery performance is important. To enable the batteries to exhibit their performance in full, it is important to hold the battery temperature at a suitable level.

On the other hand, in an HV or an EV, heat is generated at the time of charging the battery. In such a case, sometimes the battery becomes high in temperature. To secure the battery performance, the battery has to be cooled. For cooling the battery of a vehicle powered by a conventional internal combustion engine, air cooling by the natural flow of air was sufficient, but for cooling a high voltage battery with a voltage of 12V or higher which is mounted in an HV or an EV, air cooling by the natural flow of air is not sufficient.

Therefore, a battery cooling system which uses a refrigeration cycle of a vehicular air-conditioning system in an HV or EV so as to efficiently cool the battery is disclosed in Japanese Patent Publication (A) No. 2001-105843. In the battery cooling system which is disclosed in Japanese Patent Publication (A) No. 2001-105843, a battery cooler which is comprised of a base and a plurality of heat conduction fins is prepared, the battery is placed between two heat conduction fins, and the refrigerant which is used in the refrigeration cycle of the air-conditioning system is branched off and run to a refrigerant passage which is provided inside of the base so as to thereby cool the battery.

However, in the battery cooling system which is disclosed in Japanese Patent Publication (A) No. 2001-105843, while the refrigerant which is used in the refrigeration cycle of the air-conditioning system is being run to the battery cooler, the refrigerant is not being run to the air-conditioning system side. For this reason, in the battery cooling system which is disclosed in Japanese Patent Publication (A) No. 2001-105843, there was the problem that the cooling capacity of the air-conditioning system ended up falling at the time of cooling the battery and the venting temperature of the cooling air to the passenger compartment from the air-conditioning system ended up rising.

SUMMARY OF THE INVENTION

An object of the present invention is to suppress fluctuations in the venting temperature of cooling air to the inside of the passenger compartment and maintain a comfortable feeling of air-conditioning to the passengers even when using a refrigerant of a refrigeration cycle of a vehicle air-conditioning system to cool a battery which is mounted in the vehicle.

To solve the above problem, the cooling system of a battery of a first aspect of the present invention is a cooling system of a battery (50) in a vehicle which mounts a battery (31) which supplies electric power to a drive-use electric motor, an air-conditioning system (1) which is provided with an electric compressor (10), an electric compressor (10), an outside heat exchanger (11), and an inside heat exchanger (13) which are connected by a refrigerant path (17) through which a first refrigerant flows, and a control device (4), which system is provided with a branch path (18) which connects a downstream side of the outside heat exchanger (11) and an upstream side of the electric compressor (10) in the refrigerant path (17), a heat exchanger (33) which is provided in the branch path (18), a medium path (38) which is connected to the heat exchanger (33) and through which a second refrigerant which cools the battery (31) runs, and a cooling control means (5) which adjusts the flow rates of the first refrigerant which flows through the refrigerant path (17) and the branch path (18), wherein when the cooling control means (5) runs the first refrigerant to both the refrigerant path (17) and the branch path (18), it makes the control means (4) increase a target speed of the electric compressor (10).

The cooling system of a battery of a second aspect of the present invention provides a cooling system of a battery of the first aspect, wherein the cooling control means (5) is provided with flow regulators (15, 16) which regulate the flow rates of the first refrigerant which flows through the refrigerant path (17) and the branch path (18) and wherein when control of the air-conditioning system (1) by the control means (4) is given priority, the cooling control means (5) adjusts the flow regulators (15, 16) to run the entire amount of the first refrigerant to the refrigerant path (17), while when cooling of the battery (31) by the cooling control means (5) is given priority over control of the air-conditioning system (1) by the control means (4), the cooling control means (5) adjusts the flow regulators (15, 16) to make the amount of the first refrigerant which flows to the branch path (18) increase the higher the cooling priority of the battery (31) and runs the entire amount of the first refrigerant to the branch path (18) when the cooling priority of the battery (31) is higher than a predetermined level.

The cooling system of a battery of a third aspect of the present invention provides a cooling system of a battery of the second aspect, wherein the cooling control means (5) determines the cooling priority of the battery (31) in accordance with the temperature of the second refrigerant or the temperature of the battery (31) and makes the target speed of the electric compressor (10) increase the higher the cooling priority of the battery (31).

The cooling system of a battery of a fourth aspect of the present invention provides a battery cooling system of the first or third aspects, wherein the cooling control means (5) makes a target speed of the electric compressor (10) increase if the outside air temperature becomes higher than a predetermined temperature.

The cooling system of a battery of a fifth aspect of the present invention provides a cooling system of a battery of the first to fourth aspects, wherein the cooling control means (5) makes a target speed of the electric compressor (10) increase in accordance with the vehicle speed if the vehicle speed becomes higher than a predetermined speed.

The cooling system of a battery of a sixth aspect of the present invention provides a cooling system of a battery of the first or second aspect, wherein the cooling control means (5) determines an extent of making a target speed of the electric compressor (10) increase in accordance with a combination of a temperature of the second refrigerant, a temperature of the battery (31), an outside air temperature, and the vehicle speed.

The cooling system of a battery of a seventh aspect of the present invention provides a cooling system of a battery of either of the first or sixth aspect, wherein when the cooling control means (5) adjusts the flow regulators (15, 16) to run the first refrigerant to the branch path (18) and, furthermore, make the target speed of the electric compressor (10) increase, it first increases the target speed of the electric compressor (10), then, after a predetermined time elapses, adjusts the flow regulators (15, 16) to run the first refrigerant to the branch path (18).

The cooling system of a battery of an eighth aspect of the present invention provides a cooling system of a battery of the seventh aspect, wherein the cooling control means increases the flow rate of the second refrigerant after running the first refrigerant to the branch path (18).

Note that the parenthesized reference numerals given above are examples showing the correspondence with specific embodiments described later.

BRIEF DESCRIPTION OF THE DRAWINGS

The present invention may be more fully understood from the description of preferred embodiments of the invention, as set forth below, together with the accompanying drawings.

DESCRIPTION OF THE PREFERRED EMBODIMENTS

Figure 1:
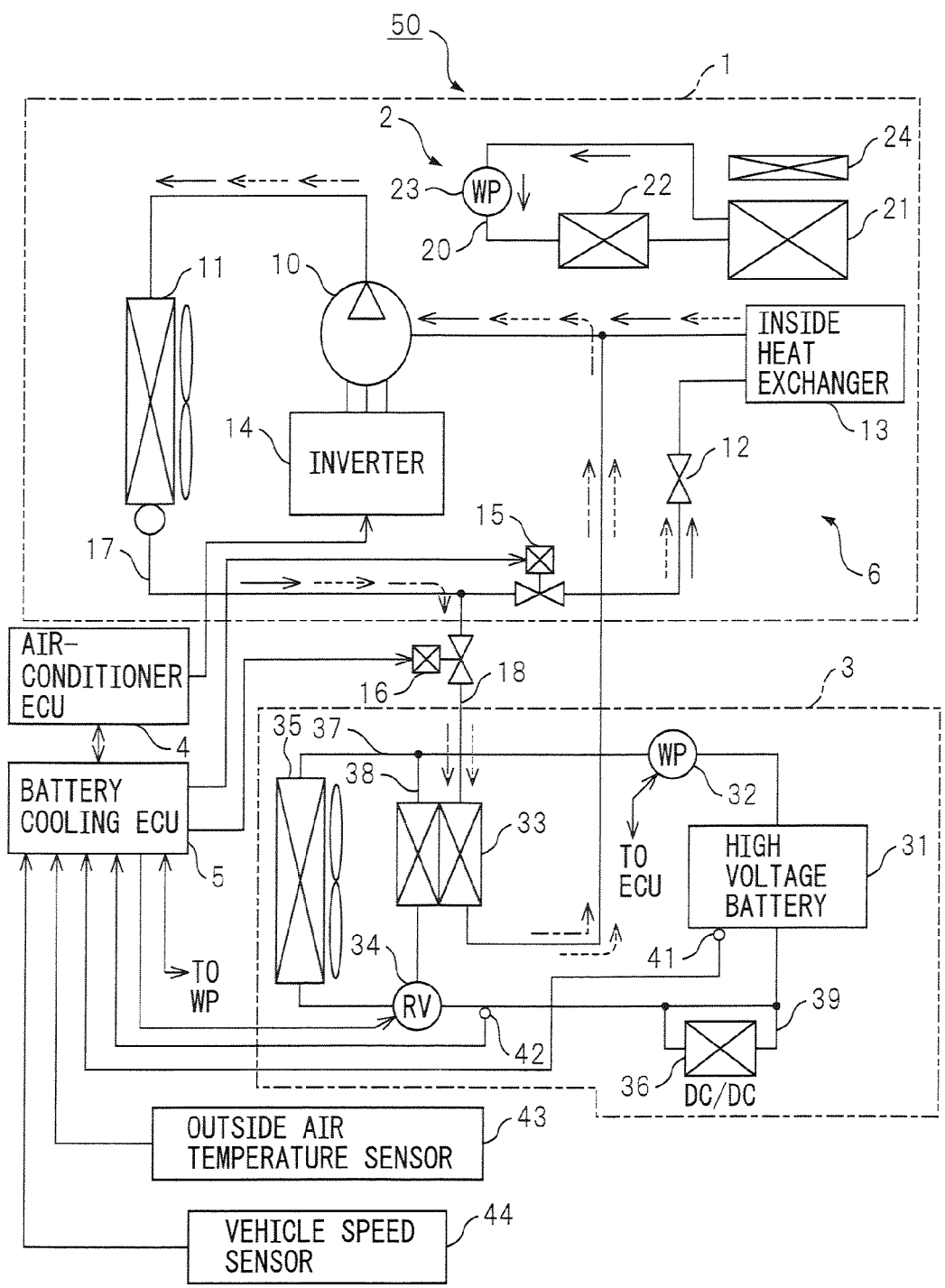
FIG. 1 is a view of the configuration which depicts an embodiment of the configuration of a cooling system of a battery of the present invention.

Below, referring to the figures, embodiments of the present invention will be explained. In the embodiments, parts of the same configuration are assigned the same reference numerals for explanation. Further, an actual vehicular air-conditioner includes inside an air/outside air switching damper, a blower, an air mix damper, vent switching dampers, etc., but these are not directly relevant to the present invention, so their illustrations are omitted.

FIG. 1 depicts the configuration of an embodiment of a cooling system of a battery 50 of the present invention. The cooling system of a battery 50 of the present embodiment is mounted in a hybrid vehicle or an electric vehicle. As the battery, a high voltage battery 31 with a large more than 12V output voltage is mounted. Further, the cooling system of a battery 50 in the present embodiment is provided with an air-conditioning system 1, a battery cooling system 3, a control device which controls the operation of the air-conditioning system 1, that is, an air-conditioner ECU 4, and a cooling control device of the battery cooling system 3, that is, the battery cooling ECU 5.

The air-conditioning system 1 is provided with a target venting temperature correction system 2 and a refrigeration cycle 6. The target venting temperature correction system 2 has a heater core 21, an electric water pump 22 and water pump 23, and a PTC heater 24 which are all connected by a medium path 20. Further, the refrigeration cycle 6 has an electric compressor 10, outside heat exchanger 11, expansion valve 12, and inside heat exchanger 13 which are all connected by a refrigerant path 17 through which a refrigerant (first refrigerant) runs. The electric compressor 10 is controlled in operation by an inverter 14 which is controlled by the air-conditioner ECU 4. Further, the configurations of the electric compressor 10 and inverter 14 are known, so explanations will be omitted.

The battery cooling system 3 is for cooling the high voltage battery 31. The high voltage battery 31 is provided with a cooling-use pipe (not depicted). This pipe is supplied with for example circulating water as a refrigerant (second refrigerant) and cools the high voltage battery 31. A circulation path (water path) 37 which is connected to the cooling-use pipe of the high voltage battery 31 is provided with a water pump 32 and a heat exchanger 35. The water which emerges from the cooling-use pipe of the high voltage battery 31 is made to flow through the circulation path 37 by the water pump 32, is cooled by the heat exchanger 35, and returns to the cooling-use pipe of the high voltage battery 31 whereupon it cools the high voltage battery 31. In the circulation path 37, a parallel water path 39 for cooling a DC/DC converter 36 is provided branched from the circulation path 37.

The above configured battery cooling system 3 in the present embodiment is provided with a branch water path 38 which bypasses the heat exchanger 35 through a three-way switching valve 34. In the middle of the branch water path 38, a water heat exchanger 33 is attached. The water heat exchanger 33 is configured so as to cool the water (second refrigerant) which flows through the branch water path 38 and flows into the water heat exchanger 33 by another refrigerant (first refrigerant) which flows through the same water heat exchanger 33. Therefore, in the present embodiment, the water which is discharged from the water pump 32 and flows through the circulation path 37 is cooled, by switching of the three-way switching valve 34, by either the heat exchanger 35 or the water heat exchanger 33 to cool the high voltage battery 31.

Further, in the present embodiment, a branch path 18 which branches off from the refrigerant path 17 is provided between the outside heat exchanger 11 and expansion valve 12 of air-conditioning system 1. This branch path 18 is connected to the inlet side of the refrigerant of the water heat exchanger 33.

The other end of the branch path 18 which connects to the refrigerant outlet side of the water heat exchanger 33 is connected to the refrigerant path 17 between the inside heat exchanger 13 and the electric compressor 10. Furthermore, a valve 16 is provided in the branch path 18 at the upstream side of the water heat exchanger 33, while a valve 15 is provided in the refrigerant path 17 at the downstream side of the branching point of the branch path 18 and the upstream side of the expansion valve 12. The valves 15 and 16 are flow regulators which regulate the flow rates of the refrigerant which flows to the refrigerant path 17 and the branch path 18. The valves 15 and 16 are operated by the battery cooling ECU 5.

Further, the high voltage battery 31 is provided with a battery temperature sensor 41 which monitors the temperature of the high voltage battery 31. The circulation path 37 is provided with a cooling water temperature sensor 42 which monitors the temperature of the cooling water which flows through the circulation path 37. The battery temperature sensor 41 and the cooling water temperature sensor 42 are connected to the battery cooling ECU 5. Furthermore, the battery cooling ECU 5 has an outside air temperature sensor 43 and a vehicle speed sensor 44 connected to it. The battery cooling ECU 5 can therefore monitor the outside air temperature and the vehicle speed.

Here, the control routine of the air-conditioning system 1 and the battery cooling system 3 by the air-conditioner ECU and the battery cooling ECU 5 in the battery cooling system 50 which is configured as depicted in FIG. 1 will be explained using the flow charts which are depicted from FIG. 2 to FIG. 7. Note that, this control routine of the air-conditioning system 1 and the battery cooling system 3 is just one example. The control routine of the air-conditioning system 1 and the battery cooling system 3 by the air-conditioner ECU and the battery cooling ECU 5 in the battery cooling system 50 which is configured as depicted in FIG. 1 is not limited to this embodiment.

Figure 2:
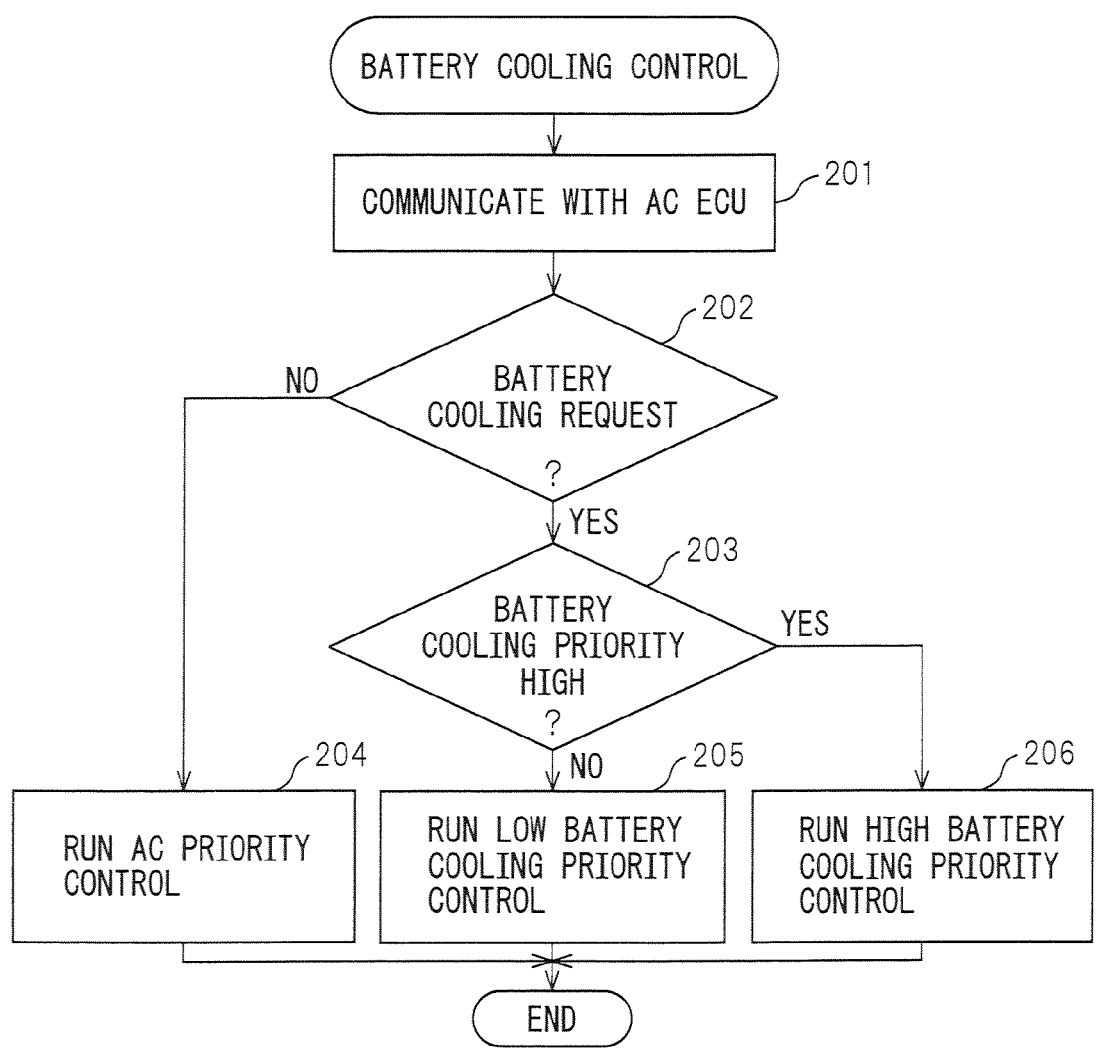
FIG. 2 is a flow chart which depicts routine of one embodiment of cooling control of a battery by a control device which is depicted in FIG. 1.

FIG. 2 is a flow chart which depicts the routine of one embodiment of cooling control of the air-conditioning system 1 and the battery cooling system 3 by the control devices which are depicted in FIG. 1, that is, the air-conditioner ECU 4 and the cooling control device, that is, the battery cooling ECU 5. The name of this control routine is simplified as "battery cooling control". This control routine is executed every predetermined time period.

At step 201, the battery cooling ECU 5 communicates with the air-conditioner ECU 4 (AC is used for air-conditioner in the drawings).

At step 202, it is judged if there is a battery cooling request. A battery cooling request is issued when giving priority to cooling of the battery 31 by the battery cooling ECU 5 overriding the control of the air-conditioning system 1. When the judgment at step 202 is there is no battery cooling request (NO), the routine proceeds to step 204 where the air-conditioner priority control is performed and this routine is ended. On the other hand, when the judgment of step 202 is that there is a battery cooling request (YES), the routine proceeds to step 203 where whether the battery cooling priority is high is judged. A "high battery cooling priority" is the case where the cooling priority of the battery 31 is higher than a predetermined level.

On the other hand, in this embodiment, the case where the battery cooling priority is not high is deemed a low battery cooling priority, but in this case, the cooling priority of the battery 31 is lower than a predetermined level. Further, when the judgment of step 203 is that the battery cooling priority is low (NO), the routine proceeds to step 205 where low battery cooling priority control is performed, while when the battery cooling priority is high (YES), the routine proceeds to step 206 where the high battery cooling priority control is performed and this routine is ended. Low battery cooling priority control and high battery cooling priority control will be explained in detail later.

Figure 3:
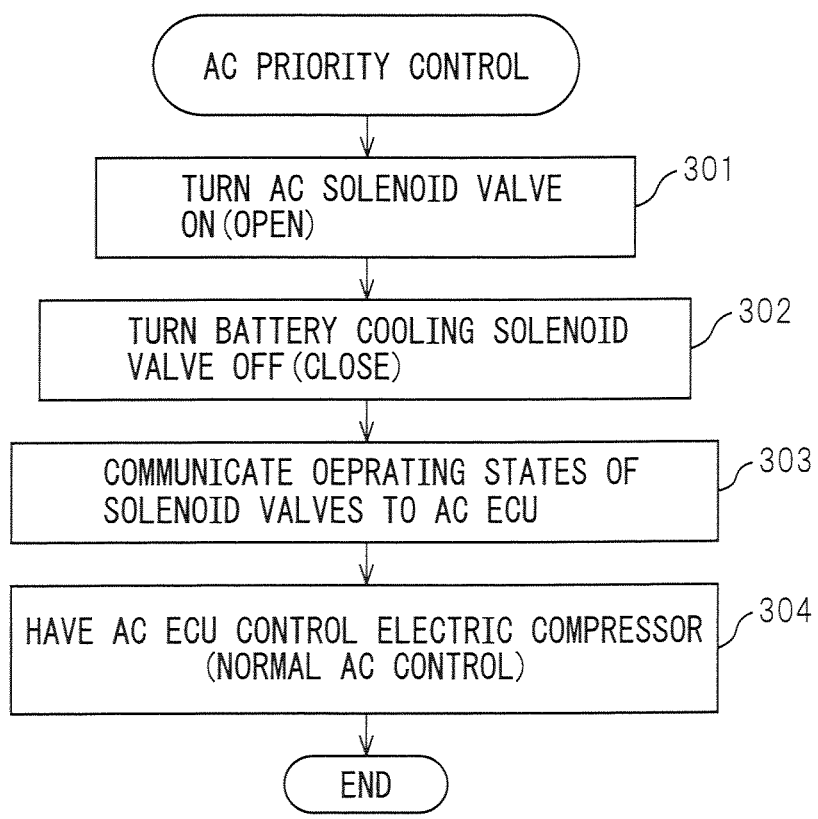
FIG. 3 is a flow chart which depicts details of the routine of air-conditioner priority control in the control routine which is depicted in FIG. 2.

FIG. 3 is a flow chart which depicts details of the routine of air-conditioner priority control at step 204 which is depicted in FIG. 2. In air-conditioner priority control, at step 301, the air-conditioning-use solenoid valve (FIG. 1, valve 15) is turned ON by the battery cooling ECU 5 and opens. At the next step 302, the battery cooling-use solenoid valve (FIG. 1, valve 16) is turned OFF by the battery cooling ECU 5 and closes. At step 303, the operating states of the solenoid valves 15 and 16 due to operation of the battery cooling ECU 5 are communicated to the air-conditioner ECU 4. At step 304, the air-conditioner ECU 4 controls the electric compressor 10 for usual air-conditioner control. In the usual air-conditioner control, the entire amount of the refrigerant (first refrigerant) flows through the refrigerant path 17. The route of the refrigerant (first refrigerant) at this time is depicted by the solid line arrow marks in FIG. 1.

Figure 4:
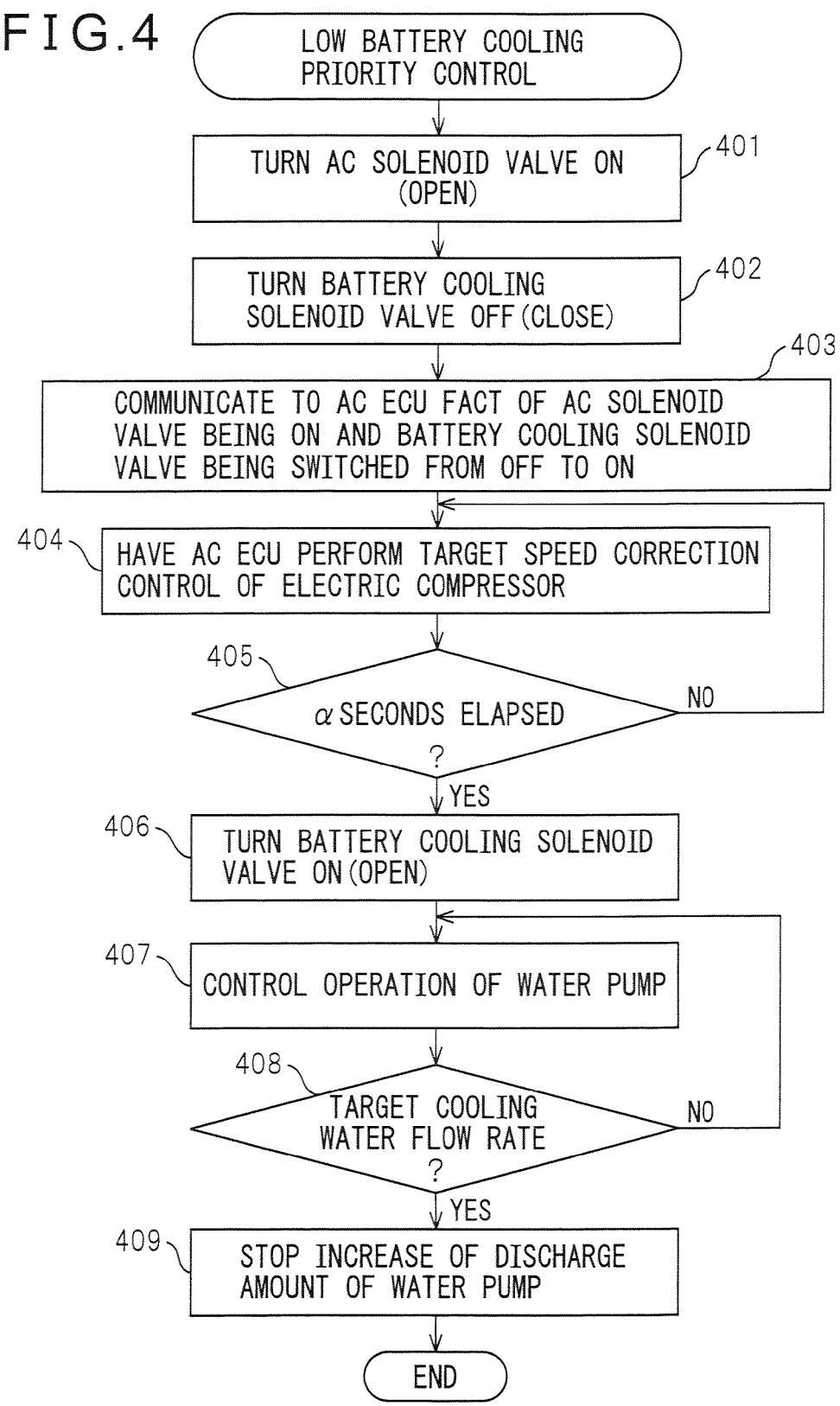
FIG. 4 is a flow chart which depicts details of the routine of low battery cooling priority control in the control routine which is depicted in FIG. 2.

FIG. 4 is a flow chart which depicts details of the routine of control at the time of low battery cooling priority at step 205 which is depicted in FIG. 2. In low battery cooling priority control, at step 401, the air-conditioning-use solenoid valve (FIG. 1, valve 15) is turned ON by the battery cooling ECU 5 and opens. At the next step 402, the battery cooling-use solenoid valve (FIG. 1, valve 16) is first turned OFF by the battery cooling ECU 5 and closes. At step 403, the ON state of the air-conditioning-use solenoid valve 15 due to operation of the battery cooling ECU 5 and the information of the battery cooling-use solenoid valve 16 being controlled from OFF to ON are communicated to the air-conditioner ECU 4.

At step 404, the air-conditioner ECU 4 to which the information of the battery cooling-use solenoid valve 16 being controlled from OFF to ON is transmitted performs target speed correction control of the electric compressor 10. The target speed correction control adds to the electric compressor target speed final output IVout an electric compressor target value correction amount f1 (IVObc) in the battery cooling request so as to correct (make up for) insufficient cooling capacity in the battery cooling and thereby prevent a drop in cooling capacity (a rise in venting temperature).

Figure 8:
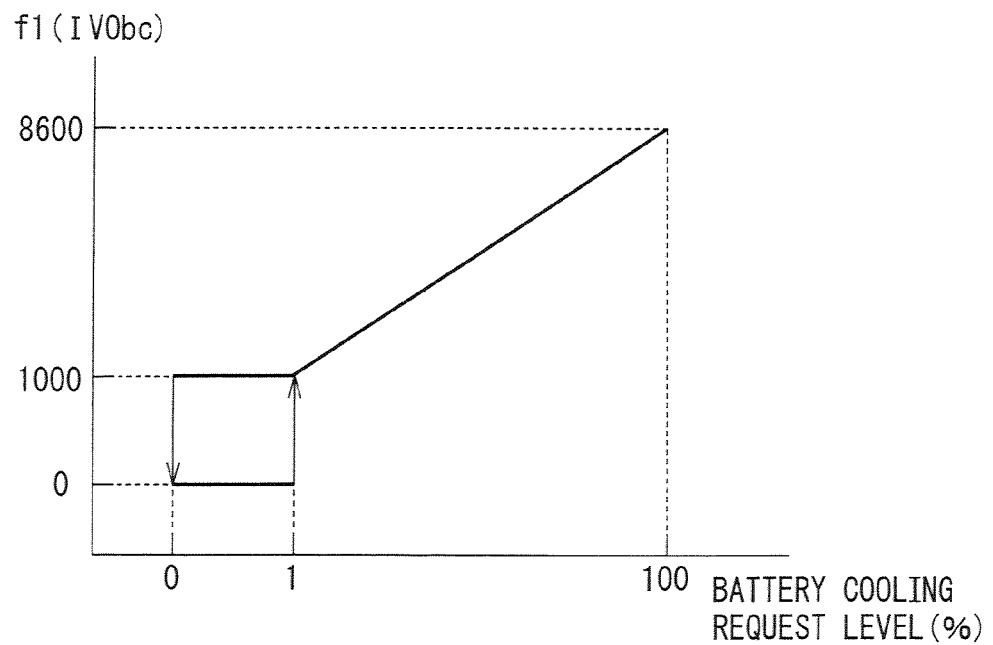
FIG. 8 is a map which depicts a relationship between a battery cooling request level in target speed correction in electric compressor control and the target speed correction value in accordance with the request level.

FIG. 8 depicts a map forming the grounds for calculating the electric compressor target value correction amount f1 (IVObc) in accordance with the cooling request level of a battery (depicted by %). The electric compressor target speed final output IVout is expressed by IVout=IVon+f1(IVObc). IVon is the target speed of the electric compressor in usual air-conditioner control. The electric compressor target value correction amount f1 (IVObc) is calculated in accordance with battery cooling request level using the map which is depicted in FIG. 8.

If the battery cooling request level is "1" or more, as the battery cooling request level becomes higher, the electric compressor target value correction amount f1 (IVObc) becomes larger. The thus calculated electric compressor target speed final output IVout is larger than the target speed IVon of the electric compressor in usual air-conditioner control. If making the speed of the electric compressor 10 increase, the cooling capacity of the air-conditioning system 1 increases.

Step 405 judges if a predetermined time of α seconds has elapsed from when the target speed correction control of the electric compressor 10 was performed at step 404. When α seconds have not elapsed (NO), the target speed correction control of the electric compressor 10 at step 404 continues to be performed. When it is judged at step 405 that α seconds have elapsed (YES), the routine proceeds to step 406 where the battery cooling-use solenoid valve (FIG. 1, valve 16) is turned ON by the battery cooling ECU 5 and opens. The value of the predetermined time of α seconds differs depending on the type of the electric compressor 10. In low battery cooling priority control, the refrigerant (first refrigerant) flows to both the refrigerant path 17 and the branch path 18. The route of the refrigerant (first refrigerant) at this time is depicted by the broken line arrows in FIG. 1.

In this way, when the refrigerant (first refrigerant) flows through both the refrigerant path 17 and the branch path 18, due to the control of step 404, the target speed correction control of the electric compressor 10 is performed, the speed of the electric compressor 10 increases in accordance with the level of the battery cooling request, and the cooling capacity of the air-conditioning system 1 increases. For this reason, even if part of the refrigerant flows branched to the branch path 18, the cooling capacity of the air-conditioning system 1 (venting temperature of cooling air) will no longer greatly fall from normal times, there will be no fear of discomfort to the passengers of the vehicle due to insufficient cooling capacity, and the comfortable feeling of air-conditioning given to the passengers will not be detracted from.

In the control at step 406, if the valve 16 of FIG. 1 opens and the first refrigerant flows through the water heat exchanger 33, at the next step 407, the operation of the water pump 32 in the battery cooling system 3 which is depicted in FIG. 1 is controlled. In the control of the operation of the water pump 32, first, the three-way switching valve 34 is switched by the battery cooling ECU 5 whereby the second refrigerant, that is, the water, flows through the branch water path 38 and is cooled by the water heat exchanger 33. Next, the amount of discharge of the water pump 32 is increased by the battery cooling ECU 5, the second refrigerant (water) which was cooled by the first refrigerant flows through the high voltage battery 31, and the high voltage battery 31 is cooled. At this time, the amount of discharge of the water pump 32 is made to gradually increase by any rate of change of the flow rate, and a rapid rise in the not depicted heat exchanger at the battery cooling side is prevented.

Step 408 judges if the amount of discharge of the water pump 32 has reached the target cooling water amount. If the amount of discharge of the water pump 32 has not reached the target cooling water amount (NO), the routine returns to step 407 where control is continued to gradually make the amount of discharge of the water pump 32 increase. When the amount of discharge of the water pump 32 reaches the target cooling water amount (YES), the routine proceeds to step 409 where the increase in the amount of discharge of the water pump 32 is stopped and this routine is ended. Due to this control, the cooling time of the high voltage battery 31 can be shortened.

Figure 5:
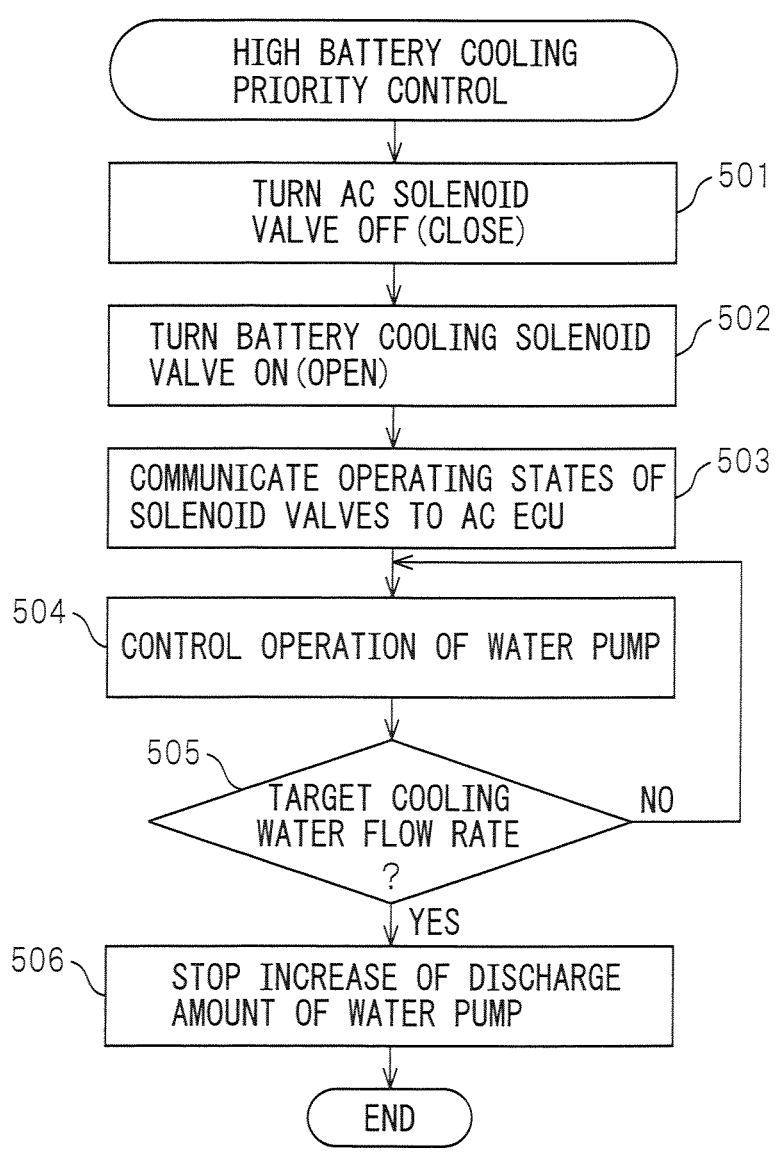
FIG. 5 is a flow chart which depicts details of the routine of high battery cooling priority control in the control routine which is depicted in FIG. 2.

FIG. 5 is a flow chart which depicts details of the routine of high battery cooling priority control at step 206 which is depicted in FIG. 2. In high battery cooling priority control, at step 501, the air-conditioning-use solenoid valve (FIG. 1, valve 15) is turned OFF by the battery cooling ECU 5 and closes. At the next step 502, the battery cooling-use solenoid valve (FIG. 1, valve 16) is turned ON by the battery cooling ECU 5 and opens. At step 503, the operating states of the solenoid valves 15 and 16 due to operation of the battery cooling ECU 5 are communicated to the air-conditioner ECU 4. The air-conditioner ECU 4, since the valve 15 is closed, operates the electric compressor 10 by battery cooling control which cools the high voltage battery 31. In battery cooling control, the route of the refrigerant (first refrigerant) which flows through the refrigerant path 17 and the branch path 18 is depicted by the one-dot chain line arrows in FIG. 1. At this time, the entire amount of the refrigerant (first refrigerant) flows through the branch path 18.

In the control at step 502, the valve 15 of FIG. 1 closes, the valve 16 opens, and first refrigerant flows through the water heat exchanger 33. When this happens, at the next step 504, control is performed to operate the water pump 32 in the battery cooling system 3 which is depicted in FIG. 1. In the control of operation of the water pump 32, first, the three-way switching valve 34 is switched by the battery cooling ECU 5, whereby the second refrigerant, that is, the water, flows through the branch water path 38 and is cooled by the water heat exchanger 33. Next, the amount of discharge of the water pump 32 is increased by the battery cooling ECU 5, the second refrigerant (water) which was cooled by the first refrigerant flows through the high voltage battery 31, and the high voltage battery 31 is thereby cooled. At this time, the amount of discharge of the water pump 32 is made to gradually increase by any rate of change of the flow rate, and a rapid rise in load of the not depicted heat exchanger at the battery cooling side is prevented.

Step 505 judges if the amount of discharge of the water pump 32 has reached the target cooling water amount. When, at step 505, the amount of discharge of the water pump 32 has not reached the target cooling water amount (NO), the routine returns to step 504 where control is continued for making the amount of discharge of the water pump 32 gradually increase. Further, when, at step 505, the amount of discharge of the water pump 32 has reached the target cooling water amount (YES), the routine proceeds to step 506 where the increase in the amount of discharge of the water pump 32 is stopped and this routine is ended. Due to this control, the cooling time of the high voltage battery 31 can be shortened.

FIG. 6 is a flow chart which depicts one example of the control routine of the electric compressor 10 in the cooling system of a battery 50 which is depicted in FIG. 1 at the time of battery cooling. This control is performed during the above explained step 206 or step 207. At step 601, the battery cooling request level is detected. Next, at step 602, the battery cooling water temperature is detected. The temperature of the battery cooling water can be detected by the cooling temperature sensor 42 which is depicted in FIG. 1. At the next step 603, the target speed of the electric compressor 10 is calculated. This target speed is calculated while considering the battery cooling request level which was detected at step 601 and the battery cooling water temperature which was detected at step 602.

Note that, in the control routine which is depicted in FIG. 6, the target speed of the electric compressor 10 is calculated while considering the battery cooling request level which was detected at step 601 and the battery cooling water temperature which was detected at step 602. However, at step 602, instead of detecting the temperature of the battery cooling water by the cooling temperature sensor 42, it is also possible to detect the temperature of the battery 31 by the temperature sensor 41.

Further, at the next step 605, control is performed to increase the speed of the electric compressor 10 in accordance with the target speed of the electric compressor 10 which was calculated at step 604. Further, at step 605, it is judged if the speed of the electric compressor 10 has reached the target increased speed. When it has not reached the target increased speed (NO), the control to increase the speed of the electric compressor 10 of step 604 continues to be performed. Further, when, at step 605, the speed has reached the target increased speed (YES), the routine proceeds to step 606 where the control for increasing the speed of the electric compressor 10 is stopped and this routine is ended.

Figure 6A:
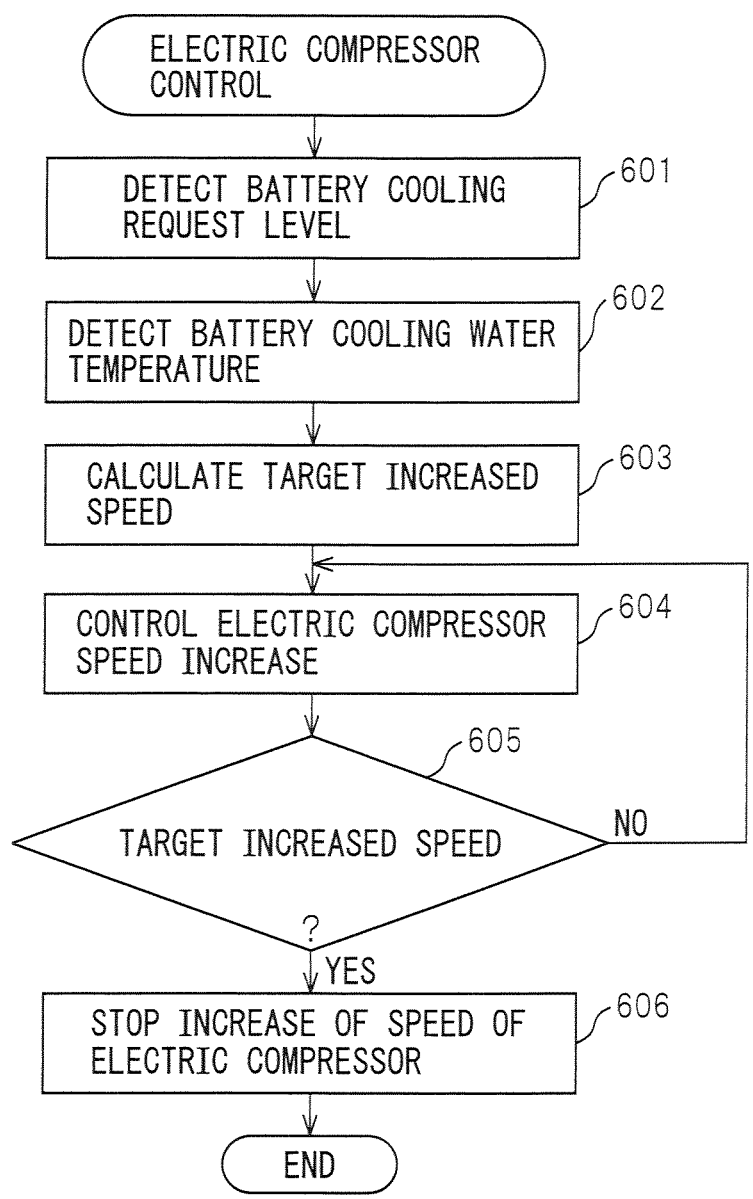
FIG. 6A is a flow chart which depicts one example of the control routine of an electric compressor in the cooling system of a battery which is depicted in FIG. 1.
Figure 6B:
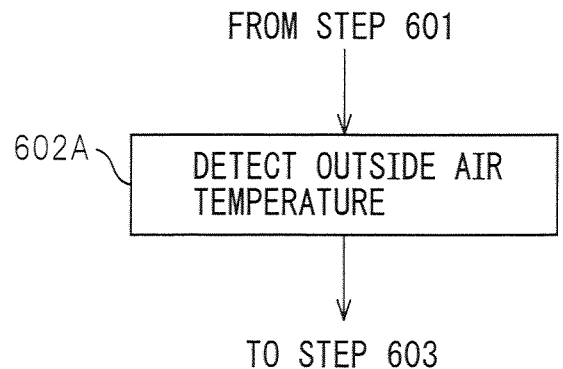
FIG. 6B is a partial flow chart which depicts another example of the control routine of an electric compressor which is depicted in FIG. 6A.

FIG. 6B is a partial flow chart which depicts another example of the control routine of the electric compressor which is depicted in FIG. 6A. In the other example which is depicted in FIG. 65, instead of detecting the battery cooling water temperature at step 602 of FIG. 6A, as depicted at step 602A, the outside air temperature is detected, then the routine proceeds to step 603. In this case, at step 603, the target increased speed of the electric compressor 10 can be calculated while considering the battery cooling request level and the outside air temperature.

Figure 6C:
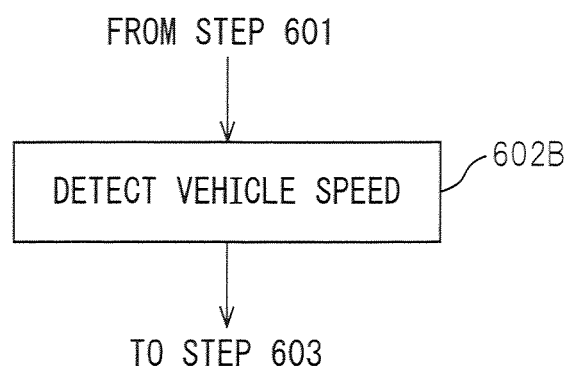
FIG. 6C is a partial flow chart which depicts still another example of the control routine of an electric compressor which is depicted in FIG. 6A.

FIG. 6C is a partial flow chart which depicts still another example of the control routine of the electric compressor which is depicted in FIG. 6A. In the other example which is depicted in FIG. 6C, instead of detection of the battery cooling water temperature at step 602 of FIG. 6A, as depicted in step 602B, the vehicle speed is detected, then the routine proceeds to step 603. In this case, at step 603, the target increased speed of the electric compressor 10 can be calculated while considering the battery cooling request level and the vehicle speed.

Figure 7:
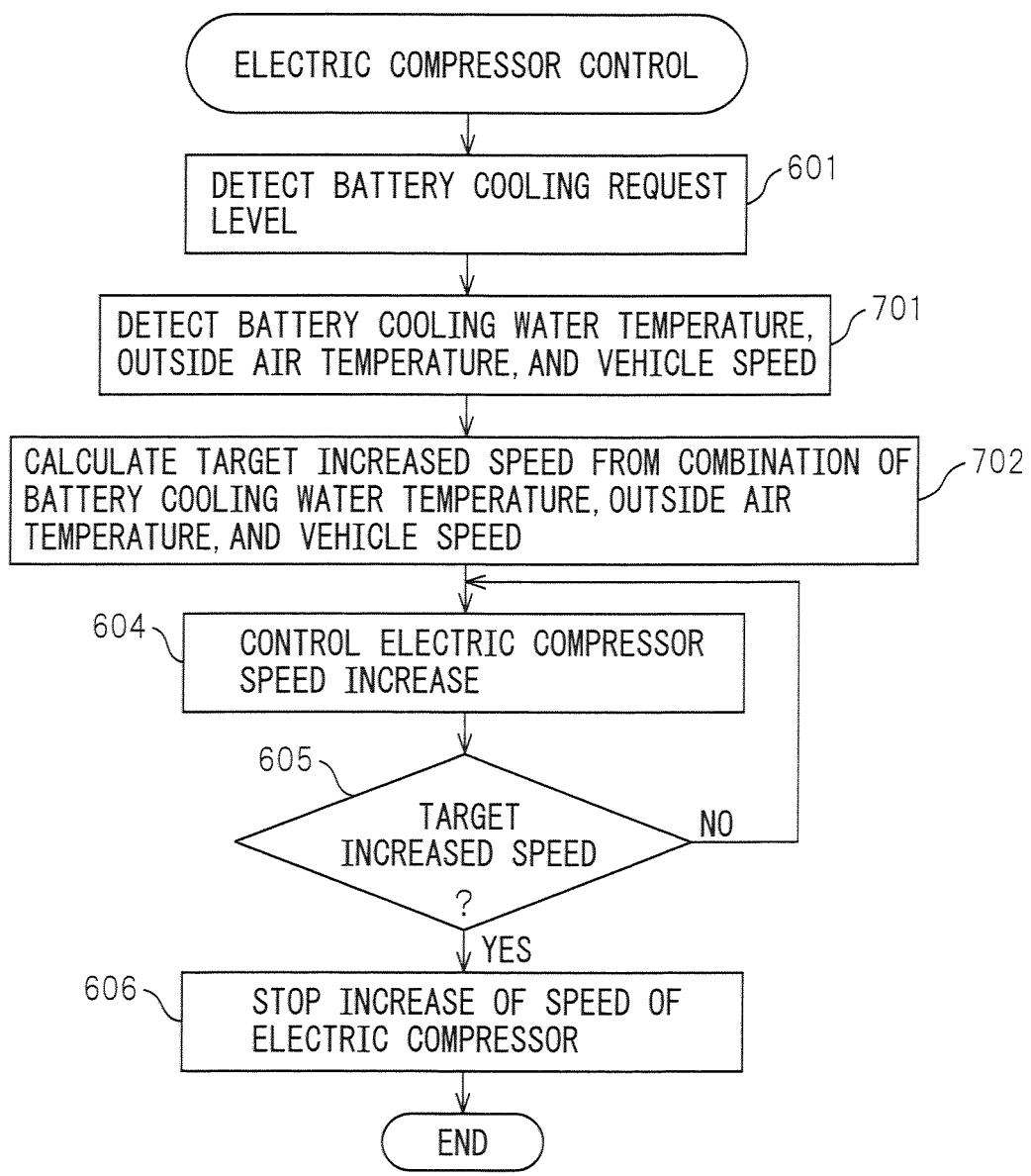
FIG. 7 is a flow chart which depicts another example of the control routine of an electric compressor in the cooling system of a battery which is depicted in FIG. 1.

FIG. 7 is a flow chart which depicts another example of the control routine of the electric compressor 10 in the cooling system of a battery 50 which is depicted in FIG. 1 at the time of battery cooling. The target increased speed of the electric compressor 10 at the time of battery cooling which was explained in FIG. 6 was calculated by a combination of any of the battery cooling request level, the battery cooling water temperature, the outside air temperature, and the vehicle speed.

On the other hand, in the other embodiment which is depicted in FIG. 7, at step 701, the battery cooling water temperature, the outside air temperature, and the vehicle speed are all detected. Further, at step 702, the target increased speed of the electric compressor 10 at the time of battery cooling is calculated while considering all of the battery cooling request level, the battery cooling water temperature, the outside air temperature, and the vehicle speed. Instead of the battery cooling water temperature, the temperature of the battery 31 may also be detected. The rest of the control routine is the same as the control routine which was explained in FIG. 6, so the same parts of the control routine are assigned the same step numbers and explanations are omitted. In the other embodiment which is depicted in FIG. 7, the target increased speed of the electric compressor 10 at the time of battery cooling can be calculated more accurately.

Figure 9:
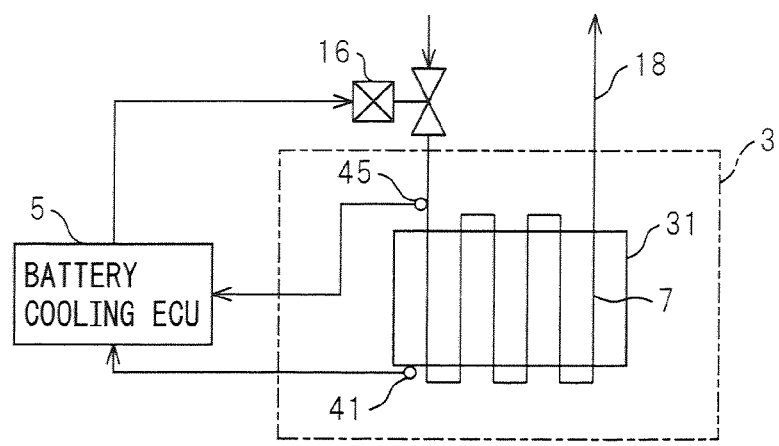
FIG. 9 is a view of the configuration which depicts another embodiment of a battery cooling system in the cooling system of a battery of the present invention.

FIG. 9 is a view of the configuration which depicts another embodiment of a battery cooling system 3 of a cooling system of a battery 50 of the present invention which is depicted in FIG. 1. In the embodiment which is depicted in FIG. 9, a high voltage battery 31 is provided with a battery cooler 7 which uses heat exchange to cool the high voltage battery 31, a refrigerant inlet side of the battery cooler 7 is connected to a valve 16, and a refrigerant outlet side of the battery cooler 7 is returned to a refrigerant path 17 between an electric compressor 10 and an inside heat exchanger 13. A battery temperature sensor 41 which detects a temperature of the high voltage battery 31 is provided and is connected to battery cooling ECU. This point is the same as with FIG. 1. Furthermore, at a refrigerant inlet side of the battery cooler 7, a refrigerant temperature sensor 45 which is connected to the battery cooling ECU is provided.

The present invention can also be applied to such a configured battery cooling system 3. By performing control similar to the control which was explained above, it is possible to prevent a drop in the cooling capacity of the air-conditioning system 1 even when cooling the high voltage battery 31. That is, even when running the first refrigerant to both of the refrigerant path 17 and the branch path 18, by increasing the target speed of the electric compressor 10, it is possible to prevent a drop in the cooling capacity of the air-conditioning system 1 even when cooling the high voltage battery 31.

In this way, in a hybrid vehicle or electric vehicle which mounts a cooling system of a battery of the present invention, it is possible to utilize the refrigerant which flows through the refrigeration cycle to cool the high voltage battery and maintain the performance of the high voltage battery.

Further, above, cooling systems of a battery the first aspect to the eighth aspect of the present invention were explained, but according to the cooling systems of a battery of the above aspects, the following are possible.

According to the cooling system of a battery of the first aspect, when the first refrigerant flows to both the refrigerant path and the branch path, the target speed of the electric compressor increases, so even if cooling the battery by using the first refrigerant of air-conditioning system, the air-conditioning of the passenger compartment is not detracted from.

According to the cooling system of a battery the second aspect, when control of the air-conditioning system is given priority, the entire amount of the first refrigerant flows through the refrigerant path, while when cooling of the battery is given priority over the air-conditioning system, the higher the cooling priority of the battery, the more the amount of the first refrigerant which flows to the branch path is increased. When the cooling priority of the battery is higher than a predetermined level, the entire amount of the first refrigerant flows to the branch path, so both when the battery cooling priority is high and when the battery cooling priority is low, battery cooling and air-conditioning can be performed well.

According to the cooling system of a battery of the third aspect, the target speed of the electric compressor changes depending on the second refrigerant temperature or the temperature of the battery, so battery cooling is efficiently performed in accordance with the second refrigerant temperature or the temperature of the battery.

According to the cooling system of a battery of the fourth aspect, the target speed of the electric compressor changes depending on the temperature of the outside air, so battery cooling is efficiently performed in accordance with the temperature of the outside air.

According to the cooling system of a battery the fifth aspect, the target speed of the electric compressor changes depending on the vehicle speed, so battery cooling is efficiently performed in accordance with the vehicle speed.

According to the cooling system of a battery of the sixth aspect, the target speed of the electric compressor is determined in accordance with the combination of the second refrigerant temperature, battery temperature, outside air temperature, and vehicle speed, so the battery cooling is efficiently performed in accordance with the combination of the second refrigerant temperature, battery temperature, outside air temperature, and vehicle speed.

According to the cooling system of a battery of the seventh aspect, after the target speed of the electric compressor increases and the electric compressor becomes higher in speed, the first refrigerant is branched to the branch path whereby the battery is cooled, so even if the flow rate of the first refrigerant at the air-conditioning system side is reduced, a drop in the air-conditioning operation of the air-conditioning system is suppressed.

According to the cooling system of a battery of the eighth aspect, at the time of battery cooling, the flow rate of the second refrigerant increases, so the battery cooling can be quickly and efficiently performed.

While the invention has been described by reference to specific embodiments chosen for purposes of illustration, it should be apparent that numerous modifications could be made thereto by those skilled in the art without departing from the basic concept and scope of the invention.

What is claimed is:

1. A cooling system of a battery in a vehicle which mounts said battery which supplies electric power for driving the vehicle, an air-conditioning system which is provided with an electric compressor, an outside heat exchanger, and an inside heat exchanger which are connected by a refrigerant path through which a first refrigerant flows, and a control unit, said system comprising:
   a branch path which connects a downstream side of said outside heat exchanger and an upstream side of said electric compressor in said refrigerant path,
   a battery heat exchanger which is provided in said branch path,
   a medium path which is connected to said battery heat exchanger and through which a second refrigerant which cools said battery runs, and
   a cooling control device which adjusts the flow rates of said first refrigerant which flows through said refrigerant path and said branch path, wherein
   when said cooling control device directs said first refrigerant to both said refrigerant path and said branch path, it makes said control unit increase a target speed of said electric compressor,
   when control of said air-conditioning system by said control unit is given priority, said cooling control device adjusts said flow regulators to run the entire amount of said first refrigerant to said refrigerant path, while
   when cooling of said battery by said cooling control device is given priority over control of said air-conditioning system by said control unit, said cooling control device adjusts said flow regulators to make an amount of said first refrigerant which flows to said branch path increase and runs the entire amount of said first refrigerant to said branch path when the cooling priority of said battery is higher than a predetermined level
   when said cooling control device controls said flow regulators to run said first refrigerant to said branch path and, furthermore, makes a target speed of said electric compressor increase, said cooling control device first increases the target speed of said electric compressor, then, after a predetermined time elapses, controls said flow regulators to run said first refrigerant to said branch path; and
   said cooling control device increases the flow rate of said second refrigerant after running said first refrigerant to said branch path.

2. The cooling system of a battery as set forth in claim 1, wherein
   said cooling control device is provided with flow regulators which regulate the flow rates of said first refrigerant which flows through said refrigerant path and said branch path;
   when control of said air-conditioning system by said control unit is given priority, said cooling control device adjusts said flow regulators to run the entire amount of said first refrigerant to said refrigerant path, while
   when cooling of said battery by said cooling control device is given priority over control of said air-conditioning system by said control unit, said cooling control device adjusts said flow regulators to make an amount of said first refrigerant which flows to said branch path increase and runs the entire amount of said first refrigerant to said branch path when the cooling priority of said battery is higher than a predetermined level.

3. The cooling system of a battery as set forth in claim 2, wherein said cooling control device determines the cooling priority of said battery in accordance with a temperature of said second refrigerant or a temperature of said battery and makes a target speed of said electric compressor increase when cooling of the battery is given priority by the control unit.

4. The cooling system of a battery as set forth in claim 1, wherein said cooling control device makes a target speed of said electric compressor increase if an outside air temperature becomes higher than a predetermined temperature.

5. The cooling system of a battery as set forth in claim 3, wherein said cooling control device makes a target speed of said electric compressor increase if an outside air temperature becomes higher than a predetermined temperature.

6. The cooling system of a battery as set forth in claim 1, wherein said cooling control device makes a target speed of said electric compressor increase in accordance with a vehicle speed if the vehicle speed becomes higher than a predetermined speed.

7. The cooling system of a battery as set forth in claim 4, wherein said cooling control device makes a target speed of said electric compressor increase in accordance with a vehicle speed if the vehicle speed becomes higher than a predetermined speed.

8. The cooling system of a battery as set forth in claim 1, wherein said cooling control device determines an increase of a target speed of said electric compressor increase in accordance with a combination of a temperature of said second refrigerant, a temperature of said battery, an outside air temperature, a the vehicle speed.

9. The cooling system of a battery as set forth in claim 2, wherein said cooling control device determines an increase of a target speed of said electric compressor in accordance with a combination of a temperature of said second refrigerant, a temperature of said battery, an outside air temperature, and a vehicle speed.

10. The cooling system of a battery as set forth in claim 8, wherein when said cooling control device controls said flow regulators to run said first refrigerant to said branch path and, furthermore, makes the target speed of said electric compressor increase, said cooling control device first increases the target speed of said electric compressor, then, after a predetermined time elapses, controls said flow regulators to run said first refrigerant to said branch path.

11. The cooling system of a battery as set forth in claim 1, wherein said vehicle is either an electric vehicle or a hybrid vehicle.

* * * * *